United States Patent [19]
Southerland

[11] Patent Number: 5,494,308
[45] Date of Patent: Feb. 27, 1996

[54] STORAGE AND DISPLAY DEVICE IN COMBINATION WITH A SHOPPING CART

[76] Inventor: David L. Southerland, 2204 Wallwood Pl., Brandon, Fla. 33511

[21] Appl. No.: 385,839

[22] Filed: Feb. 9, 1995

[51] Int. Cl.$^6$ .................................................. B62B 3/14
[52] U.S. Cl. ........................... 280/33.992; 280/DIG. 4; 280/288.4; 224/411; 220/410
[58] Field of Search ................... 280/33.991, 33.992, 280/33.993, DIG. 4, 288.4; 224/411, 277; 40/308; 220/408, 410, 23.83, 528

[56] References Cited

U.S. PATENT DOCUMENTS

| | | | |
|---|---|---|---|
| 1,615,968 | 5/1926 | Wakefield | 220/408 |
| 2,944,694 | 7/1960 | Kinsey | 220/408 |
| 3,115,986 | 12/1963 | Groff | 220/410 |
| 4,202,465 | 5/1980 | McLaren | 220/23.83 |
| 4,274,567 | 6/1981 | Sawyer | 280/33.992 |
| 4,376,502 | 3/1983 | Cohen | 280/33.992 |
| 4,756,445 | 7/1988 | Agee, Sr. | 220/410 |
| 5,002,215 | 3/1991 | Gregoire | 280/33.992 |
| 5,012,966 | 5/1991 | Turner et al. | 40/308 |
| 5,263,578 | 11/1993 | Narvey | 280/33.992 |
| 5,387,037 | 2/1995 | Daitch | 1/1 |

FOREIGN PATENT DOCUMENTS 1-308742  12/1989  Japan ...................... 220/410

Primary Examiner—Margaret A. Focarino
Assistant Examiner—Min S. Yu
Attorney, Agent, or Firm—Arthur W. Fisher, III

[57] ABSTRACT

A storage and display device for use in combination with a shopping cart for the storage of small items and articles, the display of advertising copy or material and retention of coupons comprising a rigid outer open receptacle having a similarly configured flexible inner open receptacle at least partially disposed therein and a coupon retainer.

24 Claims, 4 Drawing Sheets

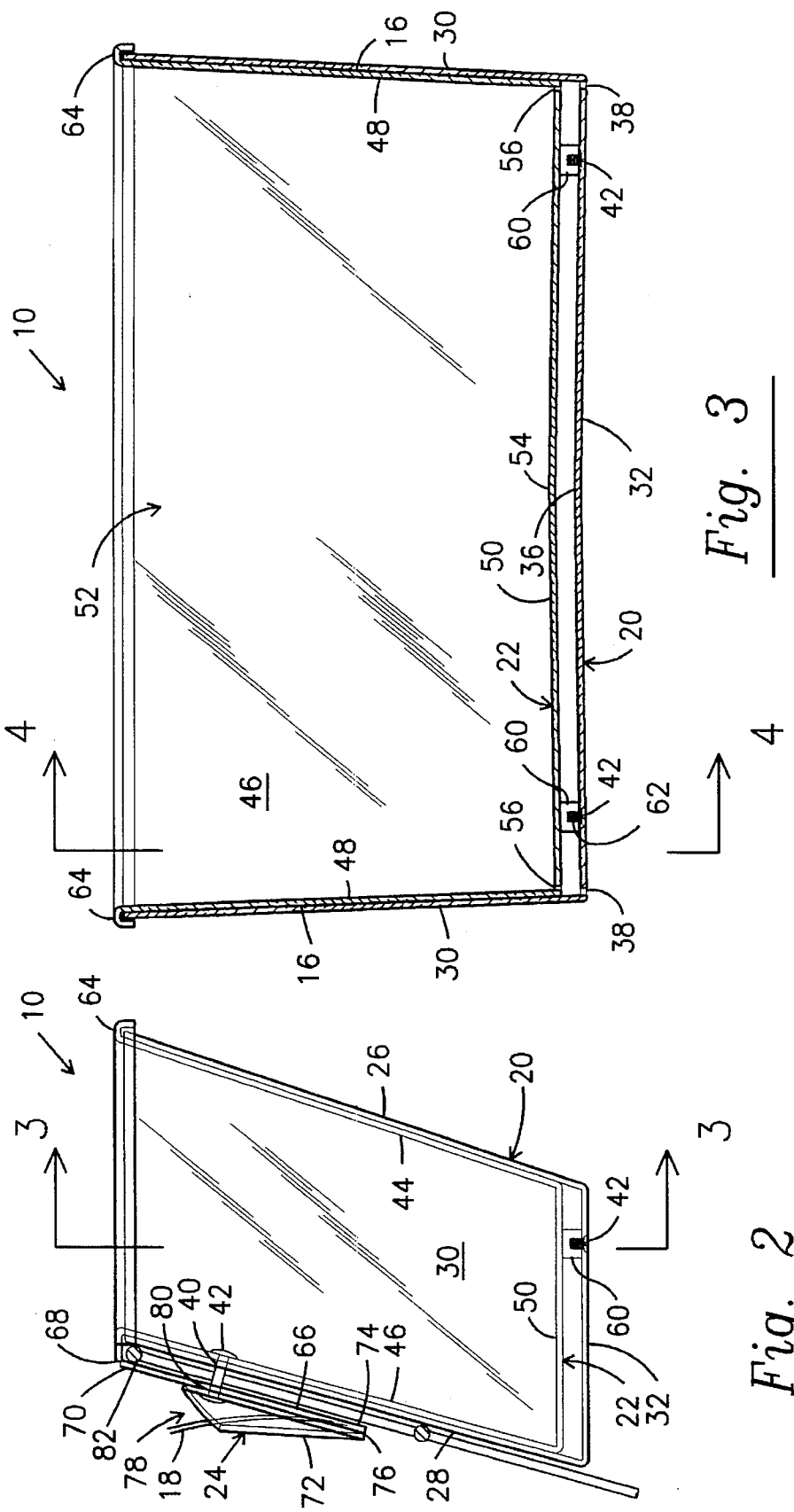

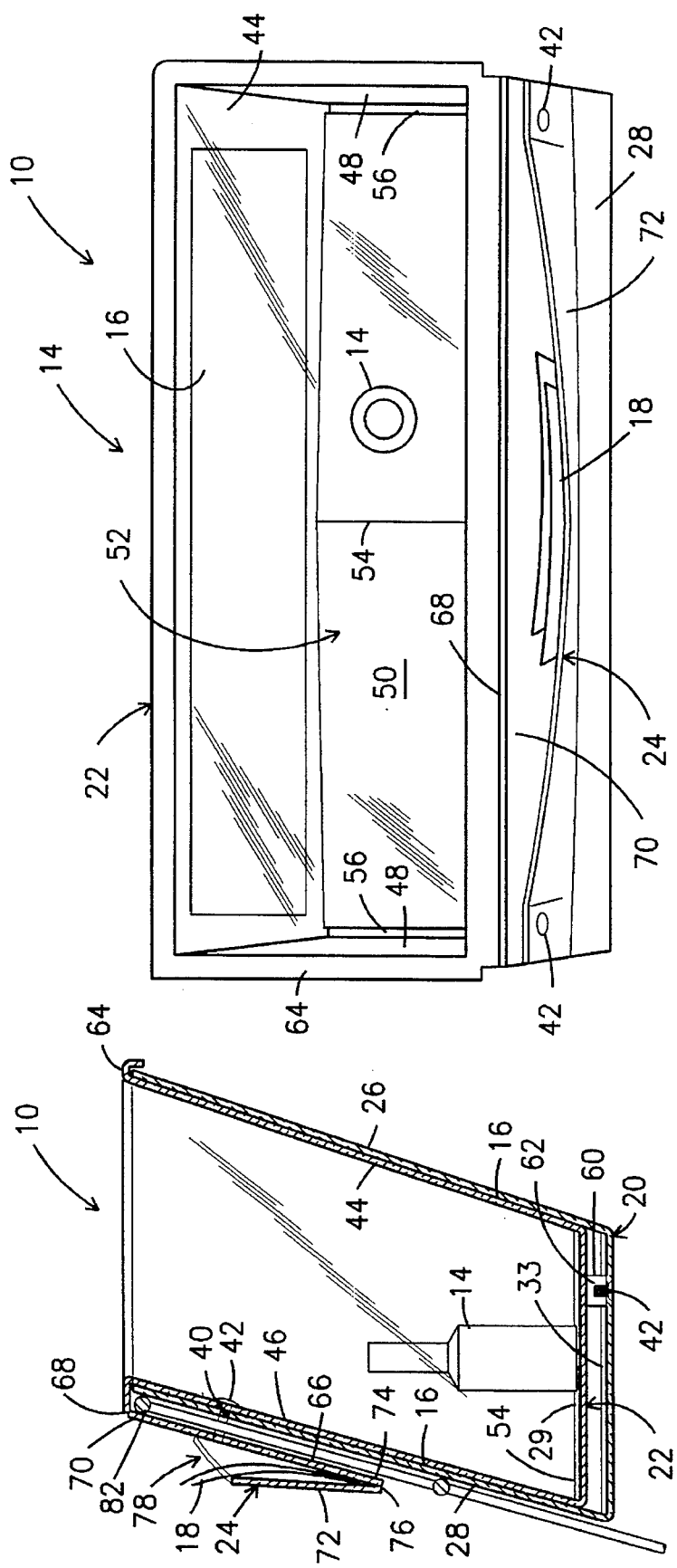

STORAGE AND DISPLAY DEVICE IN COMBINATION WITH A SHOPPING CART

FIELD OF THE INVENTION

A storage and display device for use in combination with a shopping cart.

DESCRIPTION OF THE PRIOR ART

Attachments for shopping carts which promote convenience and usage by customers in supermarkets and other stores are known in a variety of forms. Such devices have not met with wide public acceptance for various reasons. Many of the devices are too complex and costly to be practical to manufacture and sell. Others are too large and unwieldy to satisfy the desires of users. Still other devices require more or less permanent attachment to the cart and others are not sufficiently stable on the cart to satisfy the needs of store customers.

U.S. Pat. No. 3,677,570 describes a display device mounted on the vertical front of a nestable type shopping cart having a pair of display panels carrying information mounted on opposite faces of the front wall part for vertical sliding travel between a lowered retracted position and an upper extended display position. Biasing means normally maintains the device in ,extended display position. When a shopping cart is nested, the upwardly swingable rear wall of the second cart is engaged by a camming structure on at least one display panel to swing the rear wall upwardly thereby apply downwardly directed force against the display device to vertically slide the display device to retracted position.

U.S. Pat. No. 5,280,932 shows a waterproof advertising display device including a calculator adapted for use on a shopping cart of the telescopingly nestable type. The display device includes a display plate mounted on the front wall of a shopping cart upper rear receptacle to receive advertising copy and a transparent cover plate attached with keyed quick release fastener and forward release hinge over the advertising copy to the display plate. A tongue and groove seal between the plates keeps water from the advertising copy. A calculator assembly is attached to the cover plate including a slanted blind channel shelf for holding a calculator at a preferred angle for use by a shopper. A plug/bumper attached after insertion of the calculator prevents removal and protects the calculator from impact upon nesting of shopping carts.

U.S. Pat. No. 4,685,701 teaches a book-like shopping cart attachment mounted on the cart pushing handle at a convenient angle for viewing by a shopper in a supermarket or other store. The device can support a hand calculator, note paper, a pencil and a coupon holding clip. Attaching hooks engage a cross bar of the cart near and below the pushing handle. The hooks are pivotally connected to a center bar of the device limited to their swinging movement in one direction by a stop plate whereby the hooks always assume a proper angle to stabilize the device during its use on the cart.

U.S. Pat. No. 5,210,968 describes advertising panels of shopping cart baskets including a plate element and a frame element mounted on the plate element and releasable held in place thereon by a tab and slot arrangement. When held in place, a slot and a card display area encircled by the frame element are formed between the plate and frame elements. An advertisement display card is easily slid into and out of the display area through this slot. Projections on at least one of the elements retain the card in place.

SUMMARY OF THE INVENTION

The present invention relates to a storage and display device for use in combination with a shopping cart for the storage of small items and articles, the display of advertising copy or material and retention of coupons. More particularly, the storage and display device comprises a rigid outer open receptacle having a similarly configured flexible inner open receptacle at least partially disposed and a coupon retainer.

The rigid outer open receptacle comprises a front and rear wall, a pair of trapezoidal end walls and a bottom that cooperatively form a chamber.

The bottom slopes downwardly from the center line such that any liquid will flow to and through one or both drainage apertures or slots formed through the bottom adjacent the end walls.

The flexible inner open receptacle comprises front and rear walls, a pair of trapezoidal end walls and bottom that cooperatively forms a chamber.

The bottom slopes downwardly from the centerline to the trapezoidal end walls such that any liquid will flow to and through one or both drainage apertures or slots formed through the bottom adjacent the trapezoidal end walls.

A flange extends outwardly from the upper edges of the front and rear walls and the trapezoidal end walls of the flexible inner open receptacle to engage or rest on the upper edges of the front and rear walls and the trapezoidal end walls of the rigid outer open receptacle to house the display of advertising copy or material disposed between the rigid outer open receptacle and flexible inner open receptacle and to isolate or protect the advertising copy or material from the surrounding environment.

The coupon retainer comprises a flexible inner panel hingedly attached to the flexible outer panel hingedly attached to the lower edge of the flexible inner panel. The flexible inner panel and the flexible outer panel cooperatively form a coupon compartment.

When assembled, the storage and display device is mounted on the upper transverse rod of the rear gate pivotally coupled to the rear portion of the shopping cart. So positioned, the upper opening formed flange is disposed in a substantially horizontal plane.

Articles can then be placed in the chamber and coupons in the coupon compartment. The advertising copy can be easily replaced with new ads by separating the rigid outer open receptacle from the flexible inner open receptacle and sandwich new advertising copy therebetween.

The invention accordingly comprises the features of construction, combination of elements, and arrangement of parts which will be exemplified in the construction hereinafter set forth, and the scope of the invention will be indicated the claims.

BRIEF DESCRIPTION OF THE DRAWINGS

For a fuller understanding of the nature and object of the invention, reference should be had to the following detailed description taken in connection with the accompanying drawings in which:

FIG. 2 is a side view of the storage and display device of the present invention.

FIG. 3 is a cross-sectional front view of the storage and display device of the present invention.

FIG. 4 is a cross-sectional side view of the storage and display device of the present invention.

FIG. 5 is a top view of the storage and display device of the present invention.

Similar reference characters refer to similar parts throughout the several views of the drawings.

DETAILED DESCRIPTION OF THE PREFERRED EMBODIMENT

As shown in FIGS. 1 through 6, the present invention relates to a storage and display device generally indicated as 10 for use in combination with a shopping cart partially shown for the storage of small items and articles each indicated as 14, the display of advertising copy or material indicated as 16 and retention of coupons indicated as 18. More particularly, the storage and display device 10 comprises a rigid outer open receptacle generally indicated as 20 having a similarly configured flexible inner open receptacle generally indicated as 22 at least partially disposed therein and a coupon retainer generally indicated as 24.

The rigid outer open receptacle 20 comprises substantially parallel rectangular front and rear walls indicated as 26 and 28 respectively, a pair of substantially parallel trapezoidal end walls each indicated as 30 and a substantially rectangular bottom 32 that cooperatively form a chamber 34.

Figure 6:
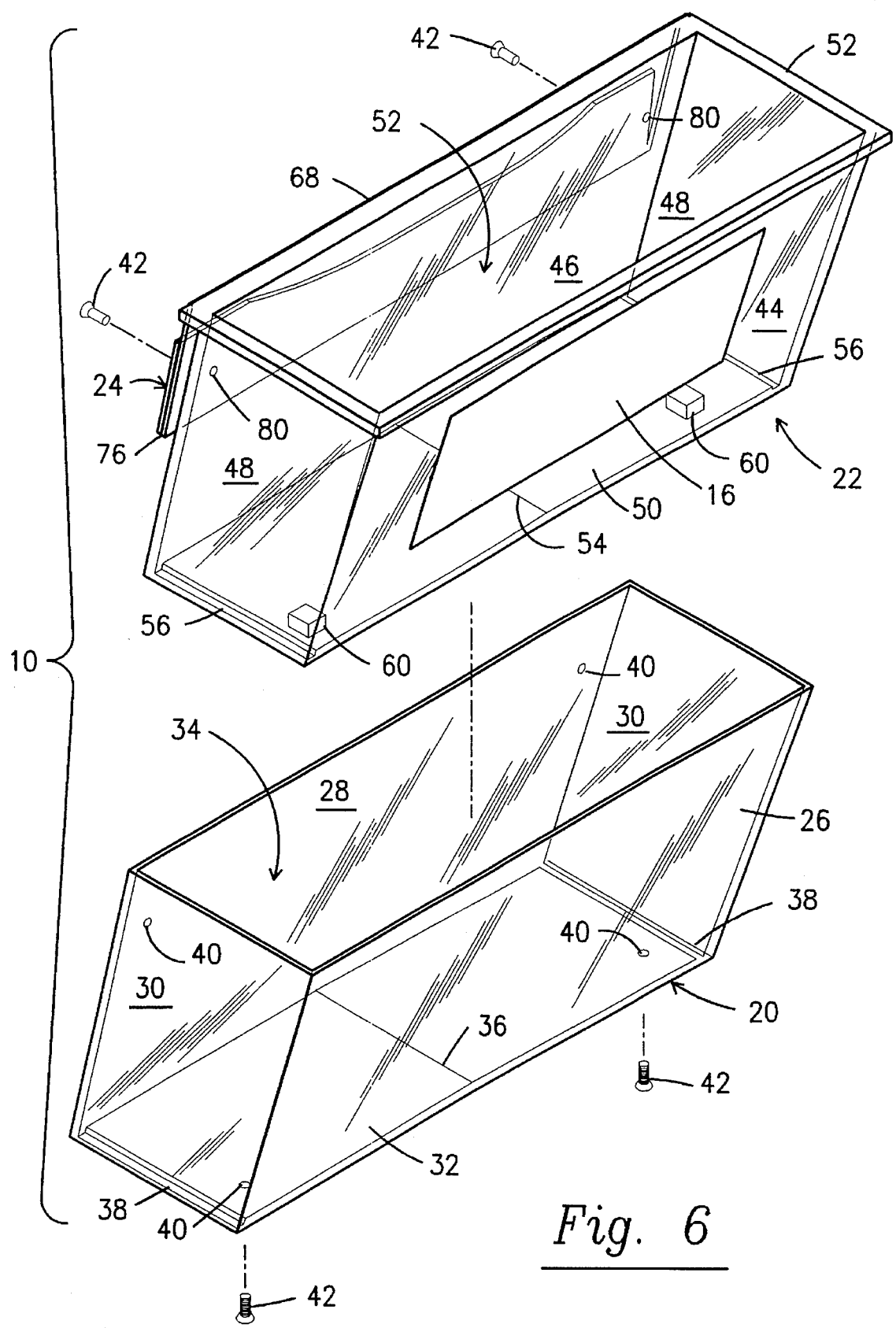
FIG. 6 is an exploded view of the storage and display device of the present invention.

As best shown in FIGS. 3 and 6, the substantially rectangular bottom 32 slopes downwardly from the centerline 36 to the substantially parallel trapezoidal end walls 30 such that any liquid on the substantially rectangular bottom 32 will flow to and through one or both drainage apertures or slots each indicated as 38 formed through the substantially rectangular bottom 32 adjacent the substantially parallel trapezoidal end walls 30. The substantially rectangular rear wall 28 and the substantially rectangular bottom 32 each include a plurality of fastener apertures each indicated as 40 to receive a corresponding plurality of fasteners each indicated as 42 as described more fully hereinafter.

The flexible inner open receptacle 22 comprises substantially parallel rectangular front and rear walls indicated as 44 and 46 respectively, a pair of substantially parallel trapezoidal end walls each indicated as 48 and a substantially rectangular bottom 50 that cooperatively form a chamber 52.

As best shown in FIGS. 3 and 6, the substantially rectangular bottom 50 slopes downwardly from the centerline 54 to the substantially parallel trapezoidal end walls 48 such that any liquid on the substantially rectangular bottom 50 will flow to and through one or both drainage apertures or slots each indicated as 56 formed through the substantially rectangular bottom 50 adjacent the substantially parallel trapezoidal end walls 48. The substantially rectangular rear wall 46 including a plurality of fastener apertures each indicated as 58 in registry with one of the corresponding fastener apertures 40 formed in the substantially parallel rear wall of the rigid outer open receptacle 20 to receive a corresponding plurality of fasteners 42 therethrough as described more fully hereinafter.

As best shown in FIGS. 2 through 4, a spacer 60 including a recess 62 formed therein is attached to receive a corresponding fastener 42 through a corresponding fastener aperture 40 formed in the substantially rectangular bottom 32.

As best shown in FIGS. 2 through 4 and 6, a substantially L-shaped or hook-shaped peripheral support and isolation flange 64 extends outwardly from the upper edges of the substantially parallel rectangular front and rear walls 44 and 46 and the substantially parallel trapezoidal end walls 48 to engage or rest on the upper edges of the substantially parallel rectangular front and rear walls 26 and 28 and the substantially parallel trapezoidal end walls 30 to house the display of advertising copy or material 16 disposed between the substantially rectangular front wall 26 and the substantially parallel rectangular front wall 44, the substantially parallel rectangular rear wall 28 and the substantially parallel rectangular rear wall 46 and the substantially trapezoidal end wall 30 and substantially trapezoidal end walls 48 and to isolate or protect the advertising copy or material 16 from the surrounding environment.

As best shown in FIGS. 2 and 4, the coupon retainer 24 comprises a flexible inner panel 66 hingedly attached to that portion of the substantially L-shaped or hook-shaped peripheral support and isolation flange 64 extending outwardly from the rear wall 46 by a hinge 68 such as a living hinge at the upper edge 70 thereof and a flexible outer panel 72 hingedly attached to the lower edge 74 of the flexible inner panel 66 by a hinge 76 such as a living hinge.

The flexible inner panel 66 and the flexible outer panel 72 cooperatively form a coupon compartment 78. A plurality of fastener apertures each indicated as 80 is formed through both the flexible inner panel 66 and the flexible outer panel 72 in registry with the fastener apertures 40 formed through the substantially rectangular rear wall 28 of the rigid outer open receptacle 20 and the substantially rectangular rear wall 46 of the flexible inner open receptacle 22 to receive a corresponding fastener 42 therethrough.

Figure 1:
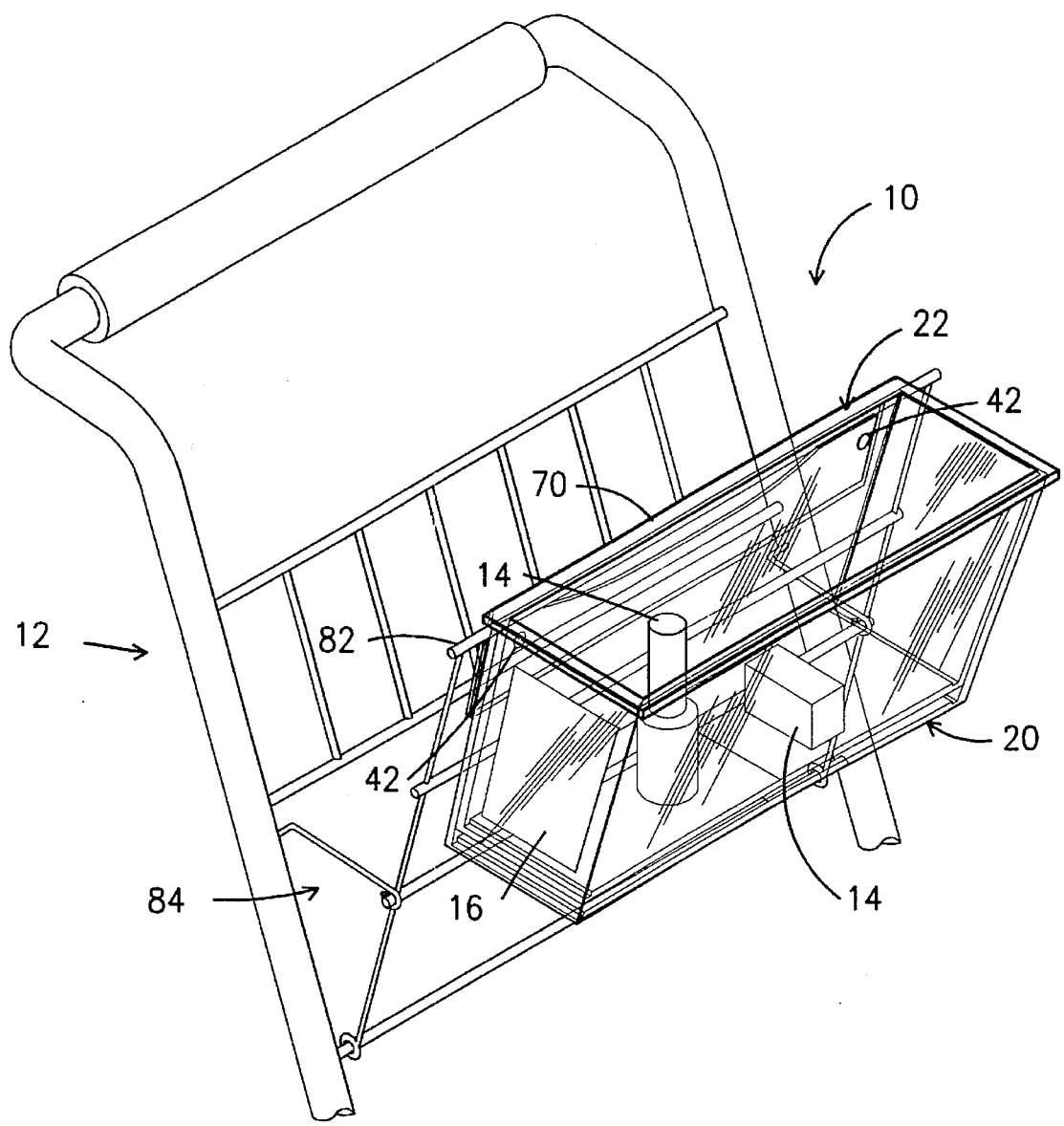
FIG. 1 is a perspective view of the storage and display device of the present invention.

When assembled, as best shown in FIGS. 1, 2 and 4, the storage and display device 10 is mounted on the upper transverse rod 82 of the rear gate generally indicated as 84 pivotally coupled to the rear portion of the shopping cart 12. So positioned, the upper opening formed by substantially L-shaped or hook-shaped peripheral support and isolation flange 64 is disposed in a substantially horizontal plane. The rigid outer open receptacle 20, the flexible inner open receptacle 22 may be secured and the coupon retainer 24 together by positioning the fasteners 42 in the appropriate fastener apertures 40 and 58 and recess 62 allowing the device to be mounted on the cart.

Articles 14 can then be placed in the chamber 52 and coupons 18 in the coupon compartment 78. The advertising copy can be easily replaced with new ads by separating the rigid outer open receptacle 20 from the flexible inner open receptacle 22 and removing the old copy and sandwiching new advertising copy 16 therebetween.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed:

1. A storage and display device in combination with a shopping cart for the storage of small items and articles and the display of advertising copy comprising an outer open receptacle mounted to the shopping cart having an inner open receptacle at least partially disposed therein to receive the small items and articles therein, said outer open receptacle comprises substantially parallel front and rear walls, a pair of substantially parallel end walls and a bottom that cooperatively form a chamber to house said inner open receptacle, said inner open receptacle comprises substantially parallel front and rear walls, a pair of substantially parallel end walls and a bottom that cooperatively form a chamber to receive the small items and articles therein and to retain the display of advertising copy or material therebetween, said bottom of said inner open receptacle slopes downwardly toward said end walls such that any liquid on said bottom flows to and through at least one drainage aperture formed through said bottom and said bottom of said outer open receptacle slopes downwardly toward said end walls such that any liquid on said bottom flows to and through at least one drainage aperture formed through said bottom.

2. The storage and display device of claim 1 wherein said rear wall of said inner open receptacle includes at least one fastener aperture to receive a fastener and wherein said rear wall of said outer open receptacle includes at least one fastener aperture in registry with said fastener aperture formed in said rear wall of said inner open receptacle to receive a corresponding fastener therethrough.

3. The storage and display device of claim 2 further includes a spacer disposed between said bottom wall of said inner open receptacle and said bottom wall of said outer open receptacle.

4. The storage and display device of claim 3 wherein said spacer includes a threaded recess formed therein and said bottom of said outer open receptacle includes a corresponding fastener aperture in alignment therewith to receive a corresponding fastener therein.

5. The storage and display device of claim 4 further including a support flange extending outwardly from the upper edges of said front and rear walls of said inner open receptacle to engage the upper edges of said front and rear walls of said outer open receptacle to house the display of advertising material disposed between said front walls and said rear walls to protect the advertising copy or material from the surrounding environment.

6. The storage and display device of claim 1 further including a coupon retainer to store coupons therein comprising an inner panel attached to a portion of said support flange and a flexible outer panel hingedly attached to the lower edge of said inner panel.

7. The storage and display device of claim 6 wherein at least one fastener aperture is formed through said inner panel and said outer panel in registry therewith to receive a fastener therethrough.

8. The storage and display device of claim 7 wherein said fastener aperture formed through said rear wall of said outer open receptacle and said aperture formed through said rear wall of said inner open receptacle aligned with said fastener apertures formed through said coupon retainer to receive a corresponding fastener therethrough.

9. The storage and display device of claim 1 comprising a rigid outer open receptacle having a similarly configured flexible inner open receptacle at least partially disposed therein and receive the small items and articles therein, said rigid outer open receptacle comprising substantially parallel rectangular front and rear walls, a pair of substantially parallel trapezoidal end walls and a substantially rectangular bottom that cooperatively form a chamber and said flexible inner open receptacle comprising substantially parallel rectangular front and rear walls, a pair of substantially parallel trapezoidal end walls and a substantially rectangular bottom that cooperatively forms a chamber.

10. A storage and display device in combination with a shopping cart for the storage of small items and articles and the display of advertising copy comprising an outer open receptacle mounted to the shopping cart having an inner open receptacle at least partially disposed therein to receive the small items and articles therein, said outer open receptacle comprises substantially parallel front and rear walls, a pair of substantially parallel end walls and a bottom that cooperatively form a chamber to house said inner open receptacle, said inner open receptacle comprises substantially parallel front and rear walls, a pair of substantially parallel end walls and a bottom that cooperatively form a chamber to receive the small items and articles therein and to retain the display of advertising copy or material therebetween, said rear wall of said inner open receptacle includes at least one fastener aperture to receive a fastener and wherein said rear wall of said outer open receptacle includes at least one fastener aperture in registry with said fastener aperture formed in said rear wall of said inner open receptacle to receive a corresponding fastener therethrough and a spacer disposed between said bottom wall of said inner open receptacle and said bottom wall of said outer open receptacle, said spacer includes a threaded recess formed therein and said bottom of said outer open receptacle includes a corresponding fastener aperture in alignment therewith to receive a corresponding fastener therein.

11. The storage and display device of claim 10 wherein said bottom of said inner open receptacle slopes downwardly toward said end walls such that any liquid on said bottom flows to and through at least one drainage aperture formed through said bottom and wherein said bottom of said outer open receptacle slopes downwardly toward said end walls such that any liquid on said bottom flows to and through at least one drainage aperture formed through said bottom.

12. The storage and display device of claim 10 further including a support flange extending outwardly from the upper edges of said front and rear walls of said inner open receptacle to engage the upper edges of said front and rear walls of said outer open receptacle to house the display of advertising material disposed between said front walls and said rear walls to protect the advertising copy or material from the surrounding environment.

13. The storage and display device of claim 10 further including a coupon retainer to store coupons therein comprising an inner panel attached to a portion of said support flange and a flexible outer panel hingedly attached to the lower edge of said inner panel.

14. The storage and display device of claim 13 wherein at least one fastener aperture is formed through said inner panel and said outer panel in registry therewith to receive a fastener therethrough.

15. The storage and display device of claim 14 wherein said fastener aperture formed through said rear wall of said outer open receptacle and said aperture formed through said rear wall of said inner open receptacle aligned with said fastener apertures formed through said coupon retainer to receive a corresponding fastener therethrough.

16. The storage and display device of claim 10 comprising a rigid outer open receptacle having a similarly configured flexible inner open receptacle at least partially disposed therein and receive the small items and articles therein, said rigid outer open receptacle comprising substantially parallel rectangular front and rear walls, a pair of substantially parallel trapezoidal end walls and a substantially rectangular bottom that cooperatively form a chamber and said flexible inner open receptacle comprising substantially parallel rectangular front and rear walls, a pair of substantially parallel trapezoidal end walls and a substantially rectangular bottom that cooperatively forms a chamber.

17. A storage and display device in combination with a shopping cart for the storage of small items and articles and the display of advertising copy comprising an outer open receptacle having an inner open receptacle at least partially disposed therein to receive the small items and articles therein, said outer open receptacle comprises substantially parallel front and rear walls, a pair of substantially parallel end walls and a bottom that cooperatively form a chamber to house said inner open receptacle, said inner open receptacle comprises substantially parallel front and rear walls, a pair of substantially parallel end walls and a bottom that cooperatively form a chamber to receive the small items and articles therein and to retain the display of advertising copy or material therebetween and further including a coupon retainer to store coupons therein comprising an inner panel attached to a portion of said rear wall of said inner open receptacle and a flexible outer panel hingedly attached to the lower edge of said inner panel and at least one fastener aperture is formed through said inner panel and said outer panel in registry therewith to receive a fastener therethrough said device mounted to the cart by said outer receptacle rear wall, said inner panel, and said fastener.

18. The storage and display device of claim 17 wherein said fastener aperture formed through said rear wall of said outer open receptacle and said aperture formed through said rear wall of said inner open receptacle aligned with said fastener apertures formed through said coupon retainer to receive a corresponding fastener therethrough.

19. A storage and display device in combination with a shopping cart for the storage of small items and articles and the display of advertising copy comprising an open receptacle to receive the small items and articles therein including substantially parallel front and rear walls, a pair of substantially parallel end walls and a bottom configured to retain the display of advertising copy or material therein and a coupon retainer comprising a flexible inner panel attached to said rear wall and a flexible outer panel attached to the lower edge of said flexible inner panel wherein said flexible inner panel and said flexible outer panel cooperatively form a coupon pocket to receive coupons therein and wherein said rear wall, said flexible inner panel and said flexible outer panel each includes at least one aperture formed therethrough to receive a corresponding fastener said device mounted to the cart by said rear wall, said inner panel, and said fastener.

20. The storage and display device of claim 19 wherein said bottom of said open receptacle slopes downwardly toward said end walls such that any liquid on said bottom flows to and through at least one drainage aperture formed through said bottom.

21. The storage and display device of claim 20 further including an outer open receptacle at least partially disposed about said inner open receptacle comprising substantially parallel front and rear walls, a pair of substantially parallel end walls and a bottom that cooperatively form a chamber to receive said open receptacle therein.

22. The storage and display device of claim 21 wherein said bottom of said outer open receptacle slopes downwardly toward said end walls such that any liquid on said bottom flows to and through at least one drainage aperture formed through said bottom.

23. The storage and display device of claim 19 further including an outer open receptacle at least partially disposed in said outer open receptacle comprising substantially parallel front and rear walls, a pair of substantially parallel end walls and a bottom that cooperatively form a chamber to said open receptacle.

24. The storage and display device of claim 23 wherein said bottom of said outer open receptacle slopes downwardly toward said end walls such that any liquid on said bottom flows to and through at least one drainage aperture formed through said bottom and wherein said bottom of said outer open receptacle slopes downwardly toward said end walls such that any liquid on said bottom flows to and through at least one drainage aperture formed through said bottom.

* * * * *